United States Patent
Zhao

(10) Patent No.: US 8,695,663 B2
(45) Date of Patent: *Apr. 15, 2014

(54) TIRE COMPONENT CONTAINING SYNDIOTACTIC-1,2-POLYBUTADIENE

(75) Inventor: Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/331,433

(22) Filed: Dec. 20, 2011

(65) Prior Publication Data

US 2013/0153102 A1    Jun. 20, 2013

(51) Int. Cl.
*B60C 19/00* (2006.01)
*B60C 1/00* (2006.01)
*C08L 9/00* (2006.01)
*C08L 7/00* (2006.01)

(52) U.S. Cl.
CPC .............. *B60C 1/0016* (2013.04); *C08L 9/00* (2013.01); *B60C 2001/0058* (2013.04); *C08L 7/00* (2013.01)
USPC ....................................................... 152/450

(58) Field of Classification Search
CPC ........... B60C 1/00; B60C 1/0016; C08L 9/00; C08L 7/00
USPC ....................................................... 152/450
See application file for complete search history.

(56) References Cited

U.S. PATENT DOCUMENTS

| | | | |
|---|---|---|---|
| 4,274,462 A | 6/1981 | Ogawa et al. | 152/209 R |
| 4,790,365 A * | 12/1988 | Sandstrom et al. | 152/510 |
| 5,091,467 A | 2/1992 | Beers | 525/57 |
| 5,307,850 A | 5/1994 | Halasa et al. | 152/209 R |
| 6,956,093 B1 | 10/2005 | Hsu et al. | 526/335 |
| 7,318,464 B2 | 1/2008 | Hahn et al. | 152/152.1 |
| 7,631,676 B2 | 12/2009 | Sandstrom et al. | 152/526 |
| 7,714,055 B2 * | 5/2010 | Zanzig et al. | 524/445 |
| 2002/0170642 A1 * | 11/2002 | Westermann et al. | 152/209.5 |
| 2006/0094825 A1 * | 5/2006 | Miyazaki | 525/236 |

FOREIGN PATENT DOCUMENTS

| | | | |
|---|---|---|---|
| EP | 0307341 | 3/1989 | B60C 1/00 |
| EP | 1241219 | 9/2002 | C08L 21/00 |
| EP | 1652882 | 5/2006 | C08L 7/00 |
| EP | 1961785 | 8/2008 | B60C 1/00 |
| EP | 2019125 | 1/2009 | C08L 7/00 |
| EP | 2147806 | 1/2010 | B60C 11/00 |
| JP | 07276907 | 10/1995 | B60C 1/00 |
| JP | 2006281744 | 10/2006 | B29D 30/52 |
| JP | 2007284554 | 11/2007 | C08L 9/00 |
| JP | 2008273519 | 11/2008 | B60C 15/06 |
| JP | 2009127001 | 6/2009 | C08L 9/00 |
| JP | 2010070039 | 4/2010 | B60C 1/00 |
| WO | 2009/084285 | 7/2009 | C08L 9/00 |

OTHER PUBLICATIONS

Carbon Black N330 Product Data. Obtained Sep. 6, 2013 at http://www.huarongroup.com/product_detail_en/id/114.html.*

* cited by examiner

*Primary Examiner* — Ling Choi
*Assistant Examiner* — Lanee Reuther
(74) *Attorney, Agent, or Firm* — Henry C. Young, Jr.

(57) ABSTRACT

The invention relates to a pneumatic tire with a component containing syndiotactic polybutadiene. The invention particularly relates to a tire with a tread configured with an outer cap rubber layer and an internal underlying rubber layer where the underlying rubber layer is comprised of such syndiotactic polybutadiene-containing rubber composition or a tire with a sidewall apex of such syndiotactic polybutadiene-containing rubber composition.

12 Claims, No Drawings

TIRE COMPONENT CONTAINING SYNDIOTACTIC-1,2-POLYBUTADIENE

FIELD OF THE INVENTION

The invention relates to a pneumatic tire with a component containing syndiotactic polybutadiene. The invention particularly relates to a tire with a tread configured with an outer cap rubber layer and an internal underlying rubber layer where the underlying rubber layer is comprised of such syndiotactic polybutadiene-containing rubber composition or a tire with a sidewall apex of such syndiotactic polybutadiene-containing rubber composition.

BACKGROUND OF THE INVENTION

Pneumatic tires are often provided with a circumferential tread of a cap/base configuration comprised of an outer ground-contacting tread cap rubber layer with a tread running surface and an internal rubber layer underlying said tread cap rubber layer such as, for example, a tread base rubber layer or intermediate rubber layer between the outer tread cap rubber layer and tread base rubber layer. Such tire constructions are well known to those having skill in such art.

The outer tread cap rubber layer is typically comprised of a rubber composition which provides resistance to tread wear during tire service, stiffness for tire handling purposes and traction for the road surface. Such typically desirable properties are well known to those having skill in such art.

The internal tread underlying rubber layer is typically comprised of a rubber composition which is less stiff than the outer tread cap rubber layer and less hysteretic to promote a reduced internal heat buildup during tire service to thereby provide a transition zone between the outer tread cap rubber layer and the tire carcass. Such typically desirable properties for a tire underlying tread base or intermediate rubber layer are well known to those having skill in such art.

However, some tires are intended to be provided for use as high performance tires which are expected to provide a challenge of enhanced (improved) handling and cornering ability. For this invention it is desired to increase a tire component's stiffness while substantially maintaining its hysteresis (e.g. tire component as a tread's internal underlying tread rubber layer or as a sidewall's apex). For the tire tread, it is desired to promote its stiffness to promote tire handling yet substantially maintain, without significantly increasing, the rubber's hysteresis property, or tendency of internal heat buildup during the tire's service.

While it is well known that a rubber composition's stiffness can normally be increased by increasing its reinforcing filler content, for example by increasing its rubber reinforcing carbon black content, it is also known that such methodology of increasing rubber stiffness through reinforcing filler increase can also be expected to significantly increase the rubber composition's hysteresis and thereby increase its internal heat buildup during tire service with a resultant usually unwanted extent of temperature increase.

It is therefore desired to evaluate significantly reducing the rubber reinforcing carbon black content below an otherwise desirable rubber reinforcement level to thereby promote a reduction of a rubber composition's hysteresis and attendant internal heat buildup combined with promoting stiffness of the tire tread base rubber layer by other means.

For such purpose, it is desired to evaluate use of a syndiotactic-1,2-polybutadiene for a rubber composition for a tire component (e.g. tread base rubber layer or apex) to promote stiffness for the rubber composition while significantly reducing its rubber reinforcing carbon black content to promote a reduction of the rubber composition's hysteresis.

It is recognized that syndiotactic polybutadiene has been used in various rubber compositions for various tire components such as for example, tire carcass and innerliner components. For example, see U.S. Pat. Nos. 5,307,850 and 6,956,093.

It is believed that use of syndiotactic polybutadiene for a tread base rubber composition combined with a significant reduction of rubber reinforcing carbon black content is novel and a departure from past practice and that such combination is warranted for evaluation.

In the description of this invention, the term "phr" where used means "parts of material by weight per 100 parts by weight of rubber". The terms "rubber" and "elastomer" may be used interchangeably unless otherwise indicated. The terms "rubber composition" and "compound" may be used interchangeably unless otherwise indicated.

A volume electrical resistivity, sometimes referred to herein as electrical resistivity, may suitably be determined by DIN 53682 or ASTM Method D257-92 and reported herein as ohm-cm.

SUMMARY AND PRACTICE OF THE INVENTION

In accordance with this invention, a pneumatic rubber tire is provided having a component comprised of a rubber composition comprised of, based on parts by weight per 100 parts by weight rubber (phr):

(A) elastomer(s) comprised of:
   (1) about 10 to about 80, alternately from about 10 to about 60, phr of syndiotactic-1,2-polybutadiene, and
   (2) about 90 to about 20, alternately from about 90 to about 40, phr of at least one additional diene-based elastomer comprised of at least one of polymers and copolymers of at least one of isoprene and 1,3-butadiene and copolymers of styrene and at least one of isoprene and 1,3-butadiene, (B) up to about 40 phr of filler reinforcement comprised of:
   (1) carbon black, or
   (2) amorphous, synthetic silica (e.g. precipitated silica), or
   (3) combination of carbon black and (said) precipitated silica, or
   (4) platelets of exfoliated clay (e.g. exfoliated montmorillonite clay) in an amount of up to about 10 phr and clay (unexfoliated clay such as, for example, kaolinite clay) in an amount of up to about 40 phr;

wherein said filler reinforcement comprised of at least one said carbon black and precipitated silica may optionally additionally contain at least one of said platelets of exfoliated clay in an amount of up to about 10 phr and said clay (unexfoliated clay) in an amount of up to about 40 phr;

wherein said carbon black based filler is comprised of at least one of:

(5) rubber reinforcing carbon black (C1) having a DBP value in a range of from about 62 to about 150 cc/100 g and an Iodine value in a range of from about 20 to about 205 $m^2/g$ in an amount of from about 5 to about 40, alternately from about 5 to about 30, phr, (6) electrically conductive carbon black (C2) having a DBP value in a range of from about 175 to about 570 cc/100 g and an Iodine value in a range of from about 180 to about 650 $m^2/g$ in an amount of from about 5 to about 20, alternately from about 5 to about 10, phr, (7) graphene platelets (C3) comprised of at least partially exfoliated graphite in an amount of up to about 15 phr, and (8) carbon nanotubes (C4) in an amount of up to about 10 phr;

wherein, in one embodiment, said precipitated silica is present in an amount of up to about 40 phr, for example from 5 to about 40 phr.

In one embodiment, said carbon black based filler is primarily distributed in a preferential elastomer, or, alternatively, a preferential continuous elastomer phase of the rubber composition by blending a primary portion of the carbon based filler with an individual elastomer, particularly where said elastomer comprises greater than 50 percent of the elastomers in the rubber composition.

Such preferential distribution may be accomplished, for example, by mixing at least a primary portion of said carbon black filler with an individual elastomer, or rubber composition containing an individual elastomer prior to blending the remaining elastomer(s) with the rubber composition which sometimes may be referred to a process of sequential mixing or Y-mixing.

In one embodiment, for example, said filler reinforcement is comprised of from about 5 to about 40, alternately from about 5 to about 20, phr of a combination of said rubber reinforcing carbon black and said electrically conductive carbon black and, alternately said precipitated silica.

In one embodiment, for example, said filler reinforcement is comprised of a combination of said rubber reinforcing carbon black and said graphene platelets and, alternately, said precipitated silica.

In one embodiment, said filler reinforcement is comprised of said rubber reinforcing carbon black and said carbon nanotubes and, alternately, said precipitated silica.

In one embodiment, said filler reinforcement is comprised of said electrically conductive carbon black and said graphene platelets and, alternately, said precipitated silica.

In one embodiment, said filler reinforcement is comprised of said electrically conductive carbon black and said carbon nanotubes and, alternately, said precipitated silica.

In one embodiment, said pneumatic rubber tire contains a circumferential rubber tread of a cap/base configuration comprised of an outer cap rubber layer containing a tread running surface and an underlying rubber layer (underlying said outer tread cap rubber layer) wherein said component is said underlying rubber layer.

In one embodiment, said pneumatic tire is comprised of a circumferential rubber tread, supporting carcass, two spaced apart beads and sidewalls connecting said beads to said tread, wherein said component is an apex extending from said bead(s) into said sidewall.

In embodiment, it is desired that the total of said carbon based filler reinforcement content is limited to a maximum of about 40, alternately a maximum of about 30, phr to promote a lower hysteresis for the rubber composition as reflected in the rubber composition's rebound value.

In practice, the syndiotactic-1,2-polybutadiene desirably has a melting point (MP) in a range of from about 80° C. to about 200° C., alternately in a range from about 100° C. to about 170° C. or from about 130° C. to about 140° C.

In one embodiment, it is desired that the melting point of said syndiotactic-1,2-polytuadiene is lower than the mixing temperature for the rubber composition which may, for example, be in a range of from about 150° C. to about 180° C. Such polymer melting point (Mp) may be determined, for example, as minimum endotherm values from differential scanning calorimetry (DSC) curves as conventionally used and understood by those having skill in such art.

The syndiotactic-1,2-polybutadiene (SPBD) for the purposes of this invention has at least 70 percent, and usually at least about 90 percent, of its repeating units in a 1,2-configuration, namely a syndiotactic 1,2-configuration, (e.g. 1,2-bonds). It is envisioned that the SPBD can be prepared, for example, in an inert organic solvent such as, for example, utilizing a procedure described in U.S. Pat. No. 3,901,868 or in an aqueous medium utilizing a process described in U.S. Pat. No. 4,506,031 and such patents are incorporated herein in their entirely as a reference for such SPBD methods of preparation.

In practice, the SPBD may be introduced into the rubber, for example, in a powder form. Alternately, the SPBD may be pre-mixed (e.g. as a powder form of the SPBD) with an elastomer for the rubber composition as a masterbatch thereof which may contain, for example, from about 10 to about 15 phr of the syndiotactic polybutadiene for which the masterbatch is then blended with the rubber composition. In other words, for example, the SPBD may be in a form of a powder at the time that it is mixed with the rubber composition or may be introduced as a pre-formed rubber masterbatch thereof.

The SPBD powder may, for example, have a particle size of an average diameter of less than about 250 microns (e.g. less than a bout 60 mesh size), alternately less than about 105 microns (e.g. less than about 140 mesh size).

The SPBD powder may be mixed with the rubber composition at a mixing temperature of the rubber composition, for example, which is at least as high as the melting point of the SPBD being used, or alternatively, at a rubber mixing temperature which is lower than the melting of the SPBD being used. During the mixing process, the mixing of the SPBD with the rubber composition is typically carried out in an internal rubber mixer, on a mill mixer, or in some other suitable type of mixing device.

Reference to rubber reinforcing carbon blacks may be found, for example, as being listed in *The Vanderbilt Rubber Handbook* (1978), Page 417, according to their ASTM designations with associated Iodine values which may range, for example, from about 20 to about 205 m2/g and DBP values which may range, for example, from 62 to about 150 ml/100 g, respectively.

Representative of carbon blacks that are considered as being electrically conductive, and suitable for said second carbon black (C2), where one or more of the following indicated "N" ASTM designated carbon blacks might also be considered as being a rubber reinforcing carbon black (C1), are, for example, N134 carbon black having an Iodine number of about 142 $m^2/g$ and a nitrogen surface area of about 131 $m^2/g$, N220 carbon black having an Iodine number of about 121 $m^2$ g and a nitrogen surface area of about 106 $m^2$ g, N472 carbon black having an Iodine number of about 270 $m^2$ g and a nitrogen surface area of about 254 $m^2$ g and a DBP value of about 254 ml/100 g, Sidcon™ 159 from Sid Richardson Corporation, Printex XE2-B™ and Corex XE™ from Orion Engineered Carbons understood to have nitrogen surface area of about 560 $m^2/g$ and DPB value of about 400 ml/100 g, Black Pearls 2000™ and Vulcan XC 72™ from Cabot Corporation, understood to have a Iodine number (value) of about 253 $m^2/g$ and DBP value of about 254 ml/100 g; 23MM™ from the 3M Company understood to have a nitrogen surface area of about 558 $m^2/g$ and a DBP value of about 300 ml/100 g; and Ketchen Blacks as EC300J™, EC600J™ and EC600JD™ understood to have nitrogen surface areas of about 1040, 800 and 1000 $m^2/100$ g, respectively, and DBP values of about 550, 360 and 500 ml/g, respectively.

It is readily seen that the electrically conductive carbon blacks, in general, differ significantly from the previously indicated rubber reinforcing carbon blacks.

Other conventional compounding ingredients may also, of course, be included in the rubber composition including, for example, zinc oxide, zinc stearate, various processing aids as well as sulfur or sulfur containing compounds together with one or more sulfur cure accelerators.

The following Examples are provided to illustrate the invention and is not intended limit the scope in which it can be practiced. Unless otherwise indicated, parts and percentages are by weight.

EXAMPLE I

Rubber samples were prepared to evaluate use of syndiotactic-1,2-polybutadiene in rubber compositions for promoting stiffness for a rubber composition.

The basic rubber composition (amounts rounded) for these Examples is reported in the following Table 1 with parts and percentages, where appropriate, by weight unless otherwise indicated.

TABLE 1

| Compound | Parts (phr) |
| --- | --- |
| Non-Productive Mixing (NP) (mixed at about 150° C. to 160° C.) | |
| Natural cis 1,4-polyisoprene rubber | 65, 59 and 52 |
| Cis 1,4-polybutadiene rubber A[1] | 0, 35 |
| Cis 1,4-polybutadiene rubber B[2] | 0, 35, 32, 28 |
| Syndiotactic-1,2-polybutadiene rubber[3] | 0, 10, 20 |
| Rubber reinforcing carbon black (N347)[4] | 45 |
| Plasticizer[5] | 2 |
| Zinc Oxide | 3 |
| Fatty acid[6] | 2 |
| Antioxidant(s) | 4 |
| Productive Mixing (P) | 2 |
| Sulfur | |
| Sulfur cure accelerator(s)[7] | 2 |
| Sulfur cure retarder[8] | 0.2 |

[1]Cis 1,4-polybutadiene A as BUD 1207 ™ from The Goodyear Tire & Rubber Company
[2]Cis 1,4-polybutadiene B as CB25 ™ from Lanxess
[3]Syndiotactic-1,2-polybutadiene as RB840 ™ from JSR having a melting point of about 126° C. and containing about 94 percent 1,2-bonds
[4]Rubber reinforcing carbon black as N347, an ASTM designation
[5]Plasticizer as unreactive phenolformaldehyde resin
[6]Fatty acid comprised primarily of stearic, palmitic and oleic acids
[7]Sulfur cure accelerator(s) as:
(a) sulfenamide for rubber Samples A, B, C and D in Table 3;
(b) sulfenamide and 1,3-bis(citraconimidamethyl) benzene for rubber Samples E, F, G, H and I in Table 3, and
(c) sulfenamide and sulfur donors as tetrabenzylthiuram disulfide and 1,6-bis(N,N-dibenzylthiocarbamoyldithio) hexane for rubber Samples J, K, L and M in Table 4
[8]Sulfur cure retarder as N-cyclohexylthiophthalimide In this Example, rubber Samples A through D were evaluated.

Control rubber Sample A was prepared with its elastomer components being a combination of natural rubber and polybutadiene rubber A without the syndiotactic polybutadiene.

Comparative rubber Sample B was prepared with its elastomer components being a combination of natural rubber and polybutadiene rubber B without the syndiotactic polybutadiene.

Experimental rubber Samples C and D were prepared with their elastomer components being a combination of natural rubber, cis 1,4-polybutadiene rubber B together with 10 and 20 phr of the syndiotactic-1,2-polybutadiene, respectively.

The rubber compositions were prepared by blending the ingredients in an internal rubber mixer in a series of sequential mixing steps while sheeting out the rubber mixtures and cooling to a temperature below 40° C. between mixing steps. The sequential mixing steps were comprised of a non-productive mixing step(s), (NP), followed by a productive mixing step (P), (in which sulfur and sulfur cure accelerators and optionally retarder were added).

Such sequential mixing steps are well known to those having skill in such art.

The following Table 2 reports cure behavior and various physical properties of rubber Samples A through D based upon the formulation of Table 1. The rubber samples were sulfur cured, where appropriate, for about 11 minutes at about 170° C.

TABLE 2

| | Parts (phr) | | | |
| --- | --- | --- | --- | --- |
| | Controls | | Exp'l Rubber Samples | |
| | A | B | C | D |
| Elastomers | | | | |
| Natural cis 1,4-polyisoporene rubber | 65 | 65 | 59 | 52 |
| Synthetic cis 1,4-polybutadiene rubber A | 35 | 0 | 0 | 0 |
| Synthetic cis 1,4-polybutadiene rubber B | 0 | 35 | 32 | 28 |
| Syndiotactic-1,2-polybutadiene rubber | 0 | 0 | 10 | 20 |
| Carbon black (N347) | 45 | 45 | 45 | 45 |
| Properties ATS (11 minutes at 170° C.)[1] | | | | |
| Tensile strength (MPa) | 20 | 19 | 19 | 19 |
| Elongation at break (%) | 472 | 422 | 406 | 386 |
| Modulus (ring) | | | | |
| 100%, (MPa) | 2.4 | 2.7 | 3.6 | 4.8 |
| 300% (MPa) | 12.4 | 14 | 15.1 | 1 |
| Hardness (Shore A) | | | | |
| 23° C. | 65 | 66 | 71 | 78 |
| 100° C. | 58 | 60 | 60 | 62 |
| Rebound (%) | | | | |
| 23° C. | 51 | 54 | 53 | 49 |
| 100° C. | 65 | 67 | 66 | 64 |
| ARES Strn Sweep, 60° C., 10% strain, 10 Hertz[2] | | | | |
| Storage modulus (G') (MPa) | 2 | 2 | 2.3 | 3 |
| Tan delta | 0.15 | 0.13 | 0.13 | 0.13 |
| Electrical Resistivity (ohm-cm)[3] | $1.2 \times 10^5$ | $1.4 \times 10^5$ | $1 \times 10^5$ | $2.2 \times 10^5$ |

[1]Data by Automated Testing System instrument (ATS) of the Instron Corporation
[2]Dynamic Mechanical Analysis (DMA) according to ASTM D5992
[3]Volume resistivity (ohm/cm) as a measure of electrical resistivity and considered herein to be a measure of electrical resistance of a rubber composition according to ASTM D257.

From Table 2 it can be observed that Experimental rubber Samples C and D with the addition of 10 and 20 phr of the syndiotactic polybutadiene, respectively, were significantly stiffer in terms of 23° C. Shore A hardness, 100 percent modulus and Storage modulus (G') while their hysteresis in terms of rebound values were substantially the same.

On this basis, an evaluation to evaluate an effect of significantly reducing the rubber reinforcing carbon black content or possibly use of an inclusion of precipitated silica reinforcement would appear to be appropriate.

EXAMPLE II

Rubber samples for this Example II were prepared to evaluate use of syndiotactic polybutadiene in rubber compositions with rubber reinforcing fillers comprised of at least one of precipitated silica and rubber reinforcing carbon. The basic rubber composition (amounts rounded) is reported in Table 1 of Example I with parts and percentages, where appropriate, by weight unless otherwise indicated.

The rubber compositions and various physical properties for this Example II are reported in the following Table 3 as rubber Samples A, B (taken from Example I) together with Experimental rubber Samples E through I.

TABLE 3

| | Parts (phr) | | | | | | |
|---|---|---|---|---|---|---|---|
| | Controls | | Exp'l Rubber Samples | | | | |
| | A | B | E | F | G | H | I |
| Elastomers | | | | | | | |
| Natural cis 1,4-polyisoprene rubber | 65 | 65 | 60 | 60 | 60 | 60 | 60 |
| Cis 1,4-polybutadiene rubber (Ni—BR) | 35 | 0 | 0 | 0 | 0 | 0 | 0 |
| Cis 1,4-polybutadine rubber (Nd—BR) | 0 | 35 | 0 | 0 | 0 | 0 | 0 |
| Syndiotactic-1,2-polybutadine rubber | 0 | 0 | 40 | 40 | 40 | 40 | 40 |
| Carbon black N650 | 0 | 0 | 0 | 15 | 30 | 0 | 0 |
| Carbon black N347 | 45 | 45 | 0 | 0 | 0 | 0 | 0 |
| Precipitated silica | 0 | 0 | 0 | 0 | 0 | 15 | 30 |
| Silica coupler | 0 | 0 | 0 | 0 | 0 | 3 | 6 |
| Sulfur | 1.8 | 1.8 | 3.6 | 3.6 | 3.6 | 3.6 | 3.6 |
| Sulfur cure accelerator(s) | 1.8 | 1.8 | 4 | 4 | 4 | 4 | 4 |
| Properties | | | | | | | |
| ATS (11 minutes at 170° C.) | | | | | | | |
| Tensile strength (MPa) | 20 | 20 | 4.4 | 10 | 15 | 11 | 18 |
| Elongation at break (%) | 472 | 422 | 208 | 336 | 332 | 348 | 465 |
| Modulus (ring) (MPa) | | | | | | | |
| 100% | 2.4 | 2.7 | 3.1 | 4.2 | 6.0 | 4.1 | 5.5 |
| 300% | 12.4 | 14 | N/A | 10 | 14.5 | 8.4 | 13.1 |
| Hardness (Shore A) | | | | | | | |
| 23° C. | 65 | 66 | 67 | 73 | 80 | 73 | 82 |
| 100° C. | 58 | 60 | 44 | 50 | 60 | 50 | 62 |
| Rebound (%) | | | | | | | |
| 23° C. | 51 | 54 | 60 | 56 | 51 | 56 | 46 |
| 100° C. | 65 | 67 | 80 | 79 | 74 | 78 | 69 |
| ARES STRN Sweep 60° C. 10 Hz | | | | | | | |
| Storage modulus (G'), 10% strain (MPa) | 2 | 2 | 1.5 | 1.9 | 2.9 | 2 | 3.1 |
| Tan delta, 10% strain | 0.15 | 0.13 | 0.03 | 0.04 | 0.08 | 0.04 | 0.09 |
| Electrical Resistivity (ohm-cm) | $1.2 \times 10^5$ | $1.4 \times 10^5$ | N/A | N/A | 1.7E+14 | N/A | N/A |

N/A = not applicable

From Table 3 it can be seen that an inclusion of 40 phr of the syndiotactic polybutadiene content for rubber Samples E through I resulted in significantly stiffer rubber compositions as indicated by their 100 percent modulus values, Shore A hardness values and ARIES storage modulus (G') values as compared to Control rubber Samples A and B without the syndiotactic polybutadiene.

The increased stiffness phenomenon was achieved with reduced hysteresis for rubber Samples E through I as indicated by their ARES tan delta values at 60° C. and 100° C. rebound values, also as compared to Control rubber Samples A and B.

It was concluded from these results that it would be interesting to evaluate eliminating the rubber reinforcing carbon black and possibly adding precipitated silica as a reinforcing filler (with coupling agent) and possibly reducing or eliminating the cis 1,4-polybutadiene rubber to seek to further increase the stiffness of the rubber composition while reducing its hysteresis.

EXAMPLE III

Rubber samples were prepared to evaluate an elimination of rubber reinforcing carbon black and possibly adding precipitated silica in a syndiotactic polybutadiene rich rubber composition. The basic rubber composition (amounts rounded) is taken from various of the ingredients reported in Table 1 of Example I with parts and percentages, where appropriate, by weight unless otherwise indicated.

The rubber compositions and various physical properties are reported in the following Table 4 as rubber Samples A, B, E previously reported in Table 3 of Example II together with Experimental rubber Samples J through M where the content of syndiotactic polybutadiene was increased from 40 phr (rubber Sample J) to 50, 80 and 100 phr, respectively for rubber Samples K, L and M, all with 8 phr of electrically conductive carbon black.

TABLE 4

| | Parts (phr) | | | | | | |
|---|---|---|---|---|---|---|---|
| | Controls | | Exp'l Rubber Samples | | | | |
| | A | B | E | J | K | L | M |
| Elastomers | | | | | | | |
| Natural cis 1,4-polyisoprene rubber | 65 | 65 | 60 | 60 | 40 | 20 | 0 |
| Cis 1,4-polybutadiene rubber (Ni—BR) | 35 | 0 | 0 | 0 | 0 | 0 | 0 |
| Cis 1,4-polybutadine rubber (Nd—BR) | 0 | 35 | 0 | 0 | 0 | 0 | 0 |
| Syndiotactic-1,2-polybutadine rubber | 0 | 0 | 40 | 40 | 60 | 80 | 100 |
| Carbon black N347 | 45 | 45 | 0 | 0 | 0 | 0 | 0 |
| Conductive Carbon black | 0 | 0 | 0 | 8 | 8 | 8 | 8 |
| Sulfur | 1.8 | 1.8 | 3.6 | 2 | 2 | 2 | 2 |
| Sulfur cure accelerator(s) | 1.8 | 1.8 | 4 | 2 | 2 | 2 | 2 |
| Sulfur donor cure accelerator(s) | 0 | 0 | 0 | 3 | 3 | 3 | 3 |
| Properties ATS (11 minutes at 170° C.) | | | | | | | |
| Tensile strength (MPa) | 20 | 20 | 4.4 | 11.2 | 12 | 15.8 | 13.9 |
| Elongation at break (%) | 472 | 422 | 208 | 310 | 284 | 310 | 202 |
| Modulus (ring) (MPa) | | | | | | | |
| 100% | 2.4 | 2.7 | 3.1 | 5.5 | 7.4 | 9.9 | 11.3 |
| 300% (N/A means the samples broke) | 12.4 | 14 | N/A | 10.2 | N/A | 15.4 | N/A |
| Hardness (Shore A) | | | | | | | |
| 23° C. | 65 | 66 | 67 | 78 | 87 | 90 | 94 |
| 100° C. | 58 | 60 | 44 | 56 | 63 | 68 | 62 |
| Rebound (%) | | | | | | | |
| 23° C. | 51 | 54 | 60 | 57 | 46 | 31 | 23 |
| 100° C. | 65 | 67 | 80 | 72 | 70 | 68 | 70 |
| ARES STRN Sweep 60° C. 10 Hz | | | | | | | |
| Storage modulus (G') | | | | | | | |
| 10% strain, MPa | 2 | 2 | 1.5 | 3.1 | 5 | 7.5 | 7.8 |
| Tan delta, 10% strain | 0.15 | 0.13 | 0.03 | 0.07 | 0.08 | 0.1 | 0.11 |
| Electrical Resistivity (ohm-cm) | $1 \times 10^5$ | $1.4 \times 10^5$ | N/A | $2 \times 10^6$ | $2.6 \times 10^6$ | $5.6 \times 10^6$ | $2 \times 10^6$ |

From Table 4 it can be seen that, as compared to Control rubber Samples A and B without syndiotactic polybutadiene and with 45 phr of rubber reinforcing carbon black:

(A) For rubber Sample E, which was provided with 40 phr of syndiotactic polybutadiene without carbon black, it is observed that Sample E exhibited similar stiffness in terms of its 100 percent modulus and 23° C. Shore A hardness and less stiff in terms of its ARES 60° C. storage modulus (G'). Its rebound value at 100° C. increased and its ARES tan delta decreased, therefore indicating a lower hysteresis.

(B) For rubber Sample J which was provided with 40 phr of syndiotactic polybutadiene and with 8 phr of an electrically conductive carbon black, it is observed that rubber Sample J exhibited substantially greater stiffness in terms of its 100 percent modulus, Shore A hardness, modulus and ARES storage modulus (G'). Its rebound value at 100° C. increased and its ARES tan delta decreased, therefore indicating a lower hysteresis.

(C) For rubber Sample K which was provided with an increased 60 phr of syndiotactic polybutadiene and with 8 phr of an electrically conductive carbon black, it is observed that rubber Sample K exhibited an even greater stiffness in terms of its 100 percent modulus, Shore A hardness, and ARES storage modulus (G'). Its rebound value at 100° C. increased an its AREA tan delta value decreased, therefore indicating a lower hysteresis.

(D) For rubber Sample L which was provided with an increased 80 phr of syndiotactic polybutadiene and with 8 phr of an electrically conductive carbon black, it is observed that rubber Sample L exhibited an even greater stiffness in terms of its 100 percent modulus, Shore A hardness, and ARES storage modulus (G'). Its rebound value at 100° C. increased and its ARES tan delta decreased, therefore indicating a lower hysteresis.

(E) For rubber Sample M which was provided with an increased 100 phr of syndiotactic polybutadiene and with 8 phr of an electrically conductive carbon black, it is observed that rubber Sample L exhibited an even greater stiffness in terms of its 100 percent modulus, Shore A hardness, and ARES storage modulus (G'). Its rebound value at 100° C. increased somewhat and its ARES tan delta value decreased, therefore indicating a lower hysteresis.

It is thereby concluded that the inclusion of the syndiotactic polybutadiene effectively increased the stiffness of the rubber composition and provided a lower hysteresis as compared to Control rubber Samples A and B.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential tread of a cap/base configuration comprised of an outer tread cap rubber layer and an internal tread rubber layer underlying said outer tread cap rubber layer where the rubber composition of the said internal tread rubber layer is comprised of, based upon parts by weight per 100 parts by weight rubber (phr):
   (A) elastomer(s) consisting of:
      (1) about 10 to about 80 phr of syndiotactic-1,2-polybutadiene containing at least 70 percent of its repeating units in a 1,2-configuration, and
      (2) about 90 to about 20 phr of at least one additional diene-based elastomer consisting of at least one of polymers and copolymers of at least one of isoprene and 1,3-butadiene and copolymers of styrene and at least one of isoprene and 1,3-butadiene,
   (B) about 5 to about 20 phr of filler reinforcement consisting of rubber reinforcing carbon black and precipitated silica, and optionally at least one additional filler selected from electrically conductive carbon black in an amount of from about 5 to about 20 phr, graphene platelets in an amount of up to 15 phr, carbon nanotubes in an amount of up to about 10 phr and platelets of exfoliated Montmorillonite clay in an amount of up to 10 phr, wherein
      (1) said rubber reinforcing carbon black (C1) has a DBP value in a range of from about 62 to about 150 cc/100 g and an Iodine value in a range of from about 20 to about 205 $m^2/g$,
      (2) said electrically conductive carbon black (C2) has a DBP value in a range of from about 175 to about 570 cc/100 g and an Iodine value in a range of from about 180 to about 650 $m^2/g$,
      (3) said graphene platelets (C3) are comprised of at least partially exfoliated graphite.

2. The tire of claim 1 wherein said rubber composition contains said additional filler as exfoliated Montmorillonite clay platelets.

3. The tire of claim 1 wherein said carbon black based filler is primarily distributed as a blend of said carbon black filler in an individual elastomer of the rubber composition.

4. The tire of claim 3 wherein said individual elastomer constitutes greater than 50 percent of the elastomers of said rubber composition.

5. The tire of claim 3 wherein said primary carbon black distribution is accomplished by mixing at least a primary portion of said carbon black filler with an individual elastomer prior to blending the remaining elastomer(s) with the rubber composition.

6. The tire of claim 1 wherein for said rubber composition said filler reinforcement is comprised of a combination of said rubber reinforcing carbon black (C1) and said electrically conductive carbon black (C2) and, said precipitated silica.

7. The tire of claim 1 wherein for said rubber composition said filler reinforcement is comprised of a combination of said rubber reinforcing carbon black (C1) and said graphene platelets (C3) and said precipitated silica.

8. The tire of claim 1 wherein for said rubber composition said filler reinforcement is comprised of said rubber reinforcing carbon black (C1) and said carbon nanotubes (C4) and said precipitated silica.

9. The tire of claim 1 wherein for said rubber composition said filler reinforcement is comprised of said electrically conductive carbon black (C1) and said graphene platelets (C3) and said precipitated silica.

10. The tire of claim 1 wherein for said rubber composition said filler reinforcement is comprised of said rubber reinforcing carbon black, said electrically conductive carbon black (C1) and said carbon nanotubes (C4) and said precipitated silica.

11. The tire of claim 1 wherein said pneumatic rubber tire contains a circumferential rubber tread of a cap/base configuration comprised of an outer cap rubber layer containing a tread running surface and an underlying rubber layer (underlying said outer tread cap rubber layer) wherein said composition is said underlying rubber layer.

12. The tire of claim 1 wherein said pneumatic tire is comprised of a circumferential rubber tread, supporting carcass, two spaced apart beads and sidewalls connecting said beads to said tread, wherein said composition is an apex extending from said bead(s) into said sidewall.

* * * * *